(12) United States Patent
Iwahashi et al.

(10) Patent No.: US 9,523,401 B2
(45) Date of Patent: Dec. 20, 2016

(54) DEVICE FOR ASSEMBLING RAILWAY WHEEL WITH BRAKE DISCS

(75) Inventors: Toru Iwahashi, Tokyo (JP); Naoto Kouchi, Osaka (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 163 days.

(21) Appl. No.: 14/374,280

(22) PCT Filed: Sep. 14, 2012

(86) PCT No.: PCT/JP2012/005884
§ 371 (c)(1),
(2), (4) Date: Jul. 24, 2014

(87) PCT Pub. No.: WO2013/111208
PCT Pub. Date: Jan. 8, 2013

(65) Prior Publication Data
US 2014/0366353 A1   Dec. 18, 2014

(30) Foreign Application Priority Data
Jan. 27, 2012   (JP) ................................. 2012-015341

(51) Int. Cl.
*B25B 27/14* (2006.01)
*F16D 65/12* (2006.01)
(Continued)

(52) U.S. Cl.
CPC .......... *F16D 65/124* (2013.01); *B23P 21/002* (2013.01); *B25B 27/14* (2013.01); *B60B 17/00* (2013.01);
(Continued)

(58) Field of Classification Search
CPC ...... B60B 30/08; B60B 17/0006; B60B 31/06; B60B 17/00; B25B 27/14; F16D 65/124; F16D 65/12; B23P 21/002; B61H 1/00
(Continued)

(56) References Cited

U.S. PATENT DOCUMENTS 2,129,178 A * 9/1938 Jordan ................ B60B 17/0017
188/218 A
2,267,311 A * 12/1941 Smith ................. B60B 17/0017
295/7

(Continued)

FOREIGN PATENT DOCUMENTS

EP    1460283 A1 * 9/2004
JP    6-67104        9/1994
JP    2003-320932   11/2003

*Primary Examiner* — Alvin Grant
(74) *Attorney, Agent, or Firm* — Clark & Brody

(57) ABSTRACT

A device for assembling a railway wheel with brake discs, the brake discs arranged to face each other across a railway wheel web and a center-deviation prevention key penetrating the web, includes a disc support supporting an internal hole of one of the brake discs; a wheel support provided concentrically with the disc support within the disc support, and supporting a hub's bore of the railway wheel on the brake disc supported by the disc support; and a bolt support provided concentrically with the disc support and the wheel support outside of the disc support, and supporting the bolt to correspond to bolt holes formed in the brake discs and the web of the railway wheel. The disc support and the wheel support are individually rotatable about a railway wheel central axis. The disc and wheel supports and the bolt support move up and down relatively to each other.

18 Claims, 5 Drawing Sheets

(51) Int. Cl.
  *B60B 17/00* (2006.01)
  *B61H 5/00* (2006.01)
  *B60B 30/08* (2006.01)
  *B60B 31/06* (2006.01)
  *B23P 21/00* (2006.01)
  *F16D 65/02* (2006.01)

(52) U.S. Cl.
  CPC .......... *B60B 17/0006* (2013.01); *B60B 30/08* (2013.01); *B60B 31/06* (2013.01); *B61H 5/00* (2013.01); *F16D 65/12* (2013.01); *B60B 17/0068* (2013.01); *B60B 2900/113* (2013.01); *F16D 2065/138* (2013.01); *F16D 2065/1392* (2013.01); *F16D 2250/0084* (2013.01); *Y10T 29/53974* (2015.01)

(58) Field of Classification Search
  USPC ........................................................ 29/281.4
  See application file for complete search history.

(56) References Cited

U.S. PATENT DOCUMENTS

| | | | | |
|---|---|---|---|---|
| 2,655,236 A | * | 10/1953 | Bachman | B61H 5/00 188/152 |
| 3,463,208 A | * | 8/1969 | Turpin | B60B 30/08 157/18 |
| 4,006,803 A | * | 2/1977 | Klein | F16D 65/124 188/218 XL |
| 4,102,443 A | * | 7/1978 | Kohler | B61H 5/00 188/218 XL |
| 4,541,163 A | * | 9/1985 | Eiting | B25B 27/02 29/270 |
| 5,321,875 A | * | 6/1994 | Hoffman | B23Q 3/183 29/261 |
| 6,233,533 B1 | * | 5/2001 | Xu | G01R 31/302 701/70 |
| 6,499,347 B1 | * | 12/2002 | Kugel | B60T 1/065 188/73.2 |
| 6,516,668 B2 | * | 2/2003 | Havira | B61K 9/10 73/634 |
| 7,437,917 B1 | * | 10/2008 | McNaughton | G01B 5/0028 73/121 |
| 9,180,921 B2 | * | 11/2015 | Joseph Xavier | B62D 55/0966 |
| 2011/0184682 A1 | * | 7/2011 | Oishi | H01R 13/641 702/82 |
| 2012/0218868 A1 | * | 8/2012 | Kahn | G01N 29/265 367/99 |
| 2013/0139974 A1 | * | 6/2013 | Gonzaga | B60C 25/01 157/16 |

* cited by examiner

FIG. 5
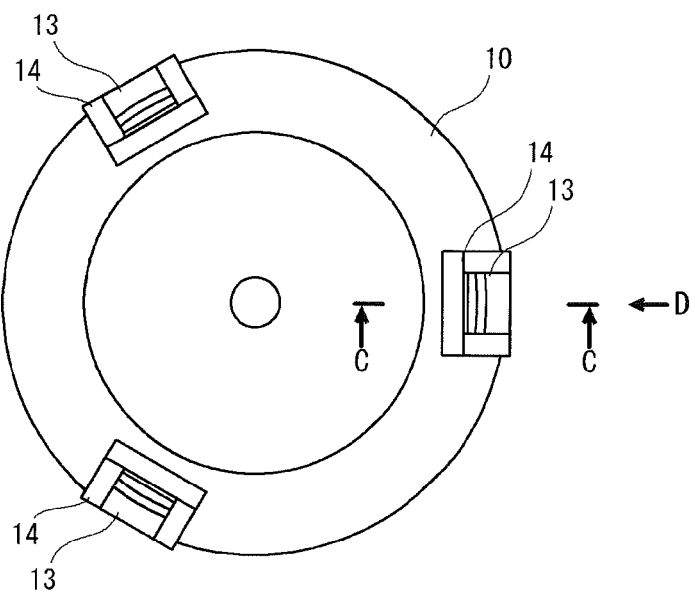
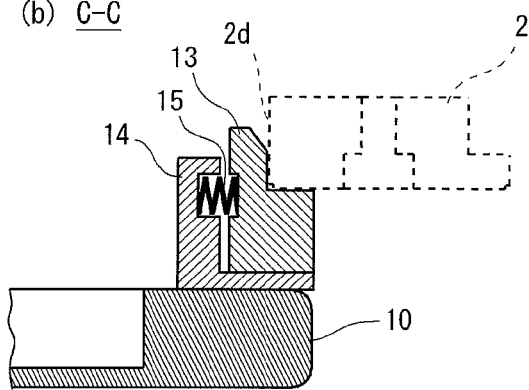
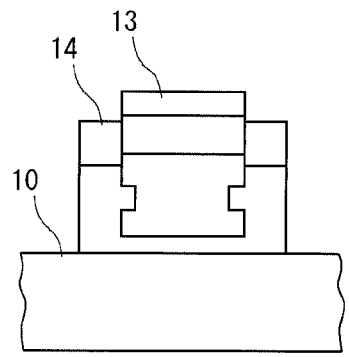

DEVICE FOR ASSEMBLING RAILWAY WHEEL WITH BRAKE DISCS

TECHNICAL FIELD

The present invention relates to an assembling device used when assembling a railway wheel with brake discs that is mounted on a railway vehicle, and particularly relates to a device for assembling a railway wheel with brake discs with center-deviation prevention keys incorporated therein.

BACKGROUND ART

A disc brake has been hitherto employed as a braking device for a railway vehicle. As the disc brake, a railway wheel (hereinafter, also simply "wheel") with brake discs (hereinafter, also simply "discs") configured so that the discs are mounted on both side surfaces of the wheel respectively is frequently used.

If the wheel with discs is one configured so that the discs are fastened to the wheel simply by bolts, a heat load generated by the friction resulting from the sliding contact between each disc and a brake lining during braking is applied to the discs and the discs repeatedly thermally expand. This results in the center deviation of the discs relative to the wheel. This is noticeable in discs intended to meet the recent demand of higher speed and lighter weight. To prevent such center deviation of the discs, the development of a wheel with discs with center-deviation prevention keys included between the discs and the wheel is underway.

FIG. 1 is an exploded perspective view of a wheel with discs with center-deviation prevention keys included therein. The wheel with discs shown in FIG. 1 is configured to include a wheel 1, a pair of discs 2 each in the form of a doughnut disc, bolts 3 and nuts 4 for fastening these discs 2, and rod-like center-deviation prevention keys 5. A front surface of each of the paired discs 2 serves as a frictional surface, and a plurality of cooling fin portions 2a are formed radially on a rear surface of the disc 2. In FIG. 1, for the sake of convenience, the radial cooling fin portions 2a are simplified into and shown as one cooling fin portion 2a.

Bolt holes 1b and 2b into which the bolts 3 are inserted are formed in a flat web 1a of the wheel 1 and the discs 2, respectively. Keyholes 1c into which the respective center-deviation prevention keys 5 are inserted are formed in the web 1a of the wheel 1, and key grooves 2c engaged with end portions of the respective center-deviation prevention keys 5 are formed in the rear surface of the discs 2 along a radial direction.

The paired discs 2 of the wheel with discs are arranged to face each other across the web 1a of the wheel 1, and the discs 2 are fastened to the wheel 1 by the bolts 3 inserted into the bolt holes 1b and 2b and the nuts 4 in a state in which the cooling fin portions 2a are in contact with the web 1a of the wheel 1. In this wheel with discs, the both end portions of the center-deviation prevention keys 5 are engaged with the key grooves 2c of the discs 2 while being inserted into the keyholes 1c of the wheel 1, and the center-deviation prevention keys 5 allow for the thermal expansion of the discs 2 with centers (center cores) of the discs 2 kept during braking.

While the number of bolts 3 is eight in FIG. 1, it suffices to use three or more bolts 3 so as to stably and securely fasten the discs 2 to the wheel 1. While the number of center-deviation prevention keys 5 is four, it suffices to use three or more center-deviation prevention keys 5 so that the center-deviation prevention keys 5 can fulfill their function.

The wheel with discs with the center-deviation prevention keys incorporated therein as described above has been hitherto assembled through procedures shown below.

(1) The bolts 3 are kept upright so as to correspond to positions of the bolt holes 1b and 2b formed in the wheel 1 and the discs 2. At this time, the bolts 3 are supported in upright profiles with heads thereof held by a dedicated bolt support tool.

(2) Out of the paired discs 2, the disc 2 arranged on a side opposite to a flange of the wheel 1 (hereinafter, also "opposite-to-flange disc 2") is suspended by a crane, and moved downward with the front surface (frictional surface) thereof turned downward while carefully positioning the bolt holes 2b thereof with respect to the bolts 3. As a result, the opposite-to-flange disc 2 is made into a state in which the bolts 3 are inserted into the bolt holes 2b of the opposite-to-flange disc 2. Center cores (centers) of the bolt holes 2b of the opposite-to-flange disc 2 thereby match those of the bolts 3.

(3) Next, the wheel 1 is suspended by the crane, and moved downward up to a state in which the wheel 1 slightly floats from the opposite-to-flange disc 2 with a surface of the wheel 1 opposite to the flange turned downward while carefully positioning the bolt holes 1b thereof with respect to the bolts 3. This makes the wheel 1 into a state in which the wheel 1 can fluctuate while remaining suspended within a range of a gap between the bolt holes 1b of the wheel 1 and the bolts 3 while the bolts 3 are being inserted into those bolt holes 1b.

(4) While the wheel 1 is kept suspended by the crane, the keyholes 1c of the wheel 1 are positioned with respect to the key grooves 2c of the opposite-to-flange disk 2 and the center-deviation prevention keys 5 are inserted into the keyholes 1c. As a result, the center-deviation prevention keys 5 are inserted into the keyholes 1c of the wheel 1 with lower end portions thereof engaged with the key grooves 2c of the opposite-to-flange disc 2. Center cores (centers) of the bolt holes 1b of the wheel 1 and those of the bolt holes 2b of the opposite-to-flange disc 2 thereby match those of the bolts 3, and center cores of the keyholes 1c of the wheel 1 and those of the key grooves 2c of the opposite-to-flange disc 2 thereby match those of the center-deviation prevention keys 5, thus positioning the wheel 1 and the opposite-to-flange disc 2.

(5) The wheel 1 is completely moved down. Thereafter, the disc 2 arranged on the same side as the flange of the wheel 1 (hereinafter, also "flange-side disc 2") is suspended by the crane, and moved downward with the front surface (frictional surface) of the flange-side disc 2 turned upward while positioning the bolt holes 2b thereof with respect to the bolts 3 and positioning the key grooves 2c thereof with respect to the center-deviation prevention keys 5. As a result, the flange-side disc 2 is made into a state in which upper end portions of the core-deviation prevention keys 5 are engaged with the key grooves 2c of the flange-side disc 2 while the bolts 3 are being inserted into those bolt holes 2b of the flange-side disc 2. The center cores (centers) of the bolt holes 1b of the wheel 1 and those of the bolt holes 2b of the both discs 2 thereby match those of the bolts 3, and the center cores of the keyholes 1c of the wheel 1 and those of the key grooves 2c of the both discs 2 thereby match those of the center-deviation prevention keys 5, thus positioning the wheel 1 and the paired discs 2.

(6) The nuts 4 are threaded into the bolts 3, thereby fastening the paired discs 2 to the wheel 1. Furthermore, the bolts 3 and the nuts 4 are additionally fastened to one another at a specified torque and thereby secured to one another.

In this way, the wheel with discs with the center-deviation prevention keys incorporated therein configured so that the paired discs 2 are arranged to face each other across the web 1a of the wheel 1 and the center-deviation prevention keys 5 penetrating this web 1a, and that the discs 2 are fastened to the wheel 1 by the bolts 3 is completed.

Meanwhile, at least three people are necessary if the wheel with discs is assembled as described above. This is because one person needs to operate the crane and two persons need to position the opposite-to-flange disc 2 suspended by the crane with respect to the bolts 3 in front and rear of the opposite-to-flange disc 2, respectively. Furthermore, it takes a long time because the assembly work for assembling the wheel with discs is performed entirely manually and the opposite-to-flange disc 2, in particular, should be positioned with respect to the bolts 3 extremely carefully. Owing to this, it is strongly desired to decrease the number of needed people and to shorten the assembly work time if the wheel with discs with the center-deviation prevention keys incorporated therein is to be assembled.

There is known the conventional technique for shortening the assembly work time for assembling the wheel with discs as follows. Patent Literature 1 discloses an assembling device that is intended at a wheel with discs that are fastened to the wheel simply by bolts, that is, a wheel with discs without center-deviation prevention keys and that is used if the wheel with discs is to be assembled.

The assembling device disclosed in Patent Literature 1 is configured as follows. A disc support for supporting inner diameters of the discs is fixedly arranged on a pedestal that can move up and down. Support of bolts to be inserted into bolt holes provided in the discs is disposed around this disc support. Moreover, a wheel support that penetrates the disc support and that is rotatable is installed at a concentric position within the disc support. The wheel support is configured to be movable upward and downward. With the assembling device configured as described above, the discs are assumed as those provided with inner diameter-side concave and convex portions, and notches are provided in the disc support to correspond to the inner diameter-side concave and convex portions. The inner diameter-side concave and convex portions of the opposite-to-flange disc are fitted first into the notches, thereby allowing centers of the bolt holes of the opposite-to-flange disc to match those of bolts of the support.

However, in a case of the wheel with discs with the center-deviation prevention keys incorporated therein to meet the recent demand of higher speed and lighter weight, concave and convex portions to be fitted into the notches of the disc supports are not provided near the inner diameter sides of the discs. It is, therefore, difficult for the assembling device disclosed in Patent Literature 1 to make the centers of the bolt holes of the opposite-to-flange disc match those of the bolts of the support. Provided that the centers of the bolt holes of the opposite-to-flange disc are made to match those of the bolts of the support, the opposite-to-flange disc suspended by a crane is moved downward while carefully positioning the bolt holes of the opposite-to-flange disc suspended by the crane with respect to the bolts of the support with at least three people involved similarly to the conventional manual work.

Therefore, the assembling device disclosed in Patent Literature 1 can insufficiently deal with the assembly work for assembling the wheel with discs with the center-deviation prevention keys incorporated therein.

CITATION LIST

Patent Literature

Patent Literature 1: Japanese Utility Model Application Publication No. 6-67104

SUMMARY OF INVENTION

Technical Problem

The present invention has been made in view of the above problems, and an object of the present invention is to provide an assembling device capable of decreasing the number of needed people and shortening assembly work time if a railway wheel with brake discs with center-deviation prevention keys incorporated therein is to be assembled.

Solution to Problem

In order to achieve the above object, a device for assembling a railway wheel with brake discs according to the present invention is a device for assembling a railway wheel with brake discs, a pair of brake discs being arranged to face each other across a web of the railway wheel and center-deviation prevention keys penetrating the web, the brake discs being fastened to the wheel by bolts, the device including:

a disc support supporting an internal hole of one of the brake discs;

a wheel support provided concentrically with the disc support within the disc support, and supporting a hub's bore of the railway wheel on the brake disc supported by the disc support; and a bolt support provided concentrically with the disc support and the wheel support outside of the disc support, and supporting the bolts to correspond to bolt holes formed in the brake discs and the web of the railway wheel, wherein the disc support and the wheel support are individually rotatable about a central axis of the railway wheel, and the disc and wheel supports and the bolt support move up and down relatively to each other.

In the device for assembling a railway wheel with brake discs described above, the brake disc supported by the disc support is preferably the brake disc arranged on a side opposite to a flange of the railway wheel.

In the device for assembling a railway wheel with brake discs described above, the disc support preferably includes an annular portion into which the internal hole of the brake disc is fitted, or three or more clutch portions, the clutch portions elastically supporting the internal hole of the brake disc radially outward.

In the device for assembling a railway wheel with brake discs described above, the bolt support preferably includes a bolt holding column, the bolt holding column being columnar and holding a head of the bolt. In this case, the bolt holding column may be configured so that an elongate hole is provided in the bolt holding column, the elongate hole radially penetrating the bolt holding column, a lower portion of the elongate hole having an increased width, the bolt holding column is fitted into a cylindrical guide portion and allowed to move up and down and to rotate, and that a pin supported by the cylindrical guide portion penetrates the elongate hole.

Advantageous Effects of Invention

According to the assembling device of the present invention, if a railway wheel with brake discs with center-deviation prevention keys included therein is to be assembled, then the disc support supports one of the discs, the wheel support supports the wheel, and the wheel support and the disc support are then individually rotated, whereby it is possible to facilitate attaching the center-deviation prevention keys. Furthermore, the other disc is mounted on the wheel with the center-deviation prevention keys set as a guide, thereby making the center cores of the bolt holes of the wheel match those of the bolt holes of the respective discs. The wheel and the paired discs are positioned and integrated with one another by the center-deviation prevention keys. Owing to this, by integrally rotating the wheel support and the disc support, it is possible to facilitate positioning the bolt holes of the wheel and the respective discs with respect to the bolts of the bolt support. Thereafter, the bolt support is moved upward with respect to the disc support and the wheel support, thereby making it possible to facilitate inserting the bolts into the bolt holes.

From the foregoing, it is possible for the center cores of the bolt holes of the wheel to easily match those of the bolt holes of the respective discs, and also possible to easily position those bolt holes with respect to the bolts of the bolt support with the help of only one person without need to perform these operations carefully. Therefore, it is possible to shorten the assembly work time.

BRIEF DESCRIPTION OF DRAWINGS

FIG. 5 shows a modification of a disc support structure provided by the disc support in the assembling device according to the present invention. In the figure, FIG. 5 (*a*) is a plan view, FIG. 5 (*b*) is a cross-sectional view taken along C-C of FIG. 5 (*a*), and FIG. 5 (*c*) is a view from an arrow D of FIG. 5 (*a*).

DESCRIPTION OF EMBODIMENTS

Hereinafter, embodiments of the device for assembling a wheel with discs according to the present invention are described in detail.

Figure 1:
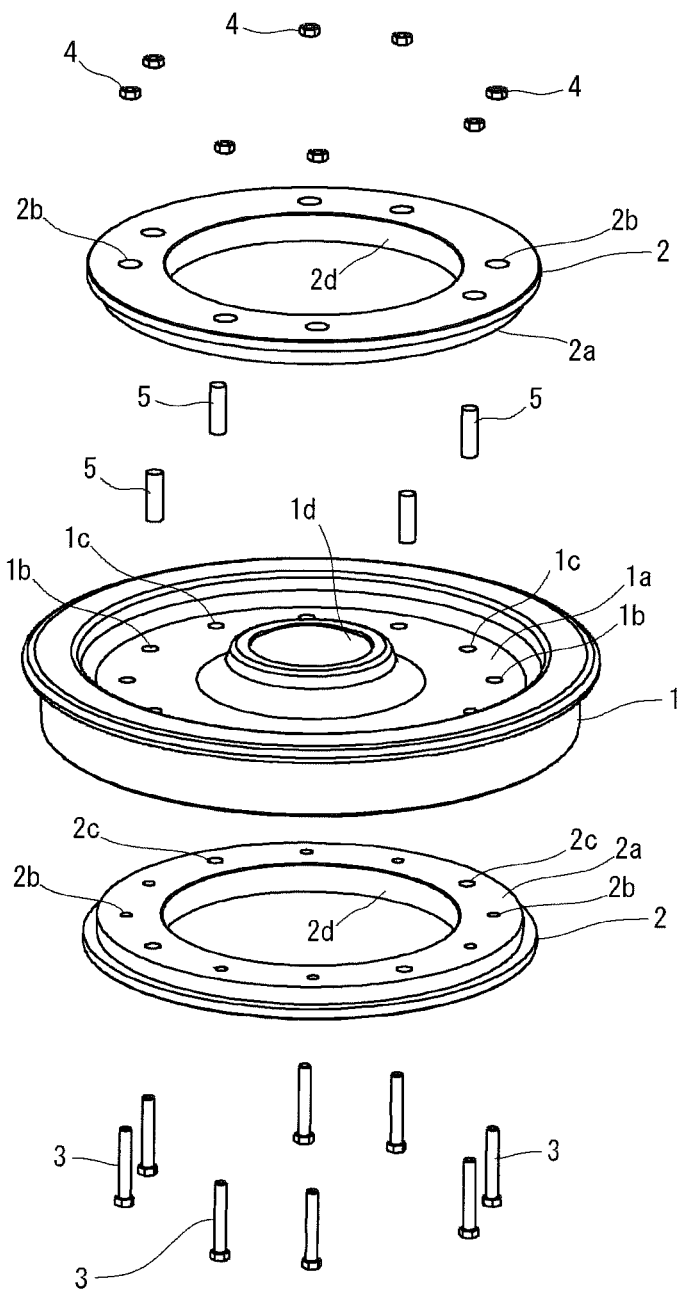
FIG. 1 is an exploded perspective view showing a wheel with discs with center-deviation prevention keys incorporated therein.
Figure 2:
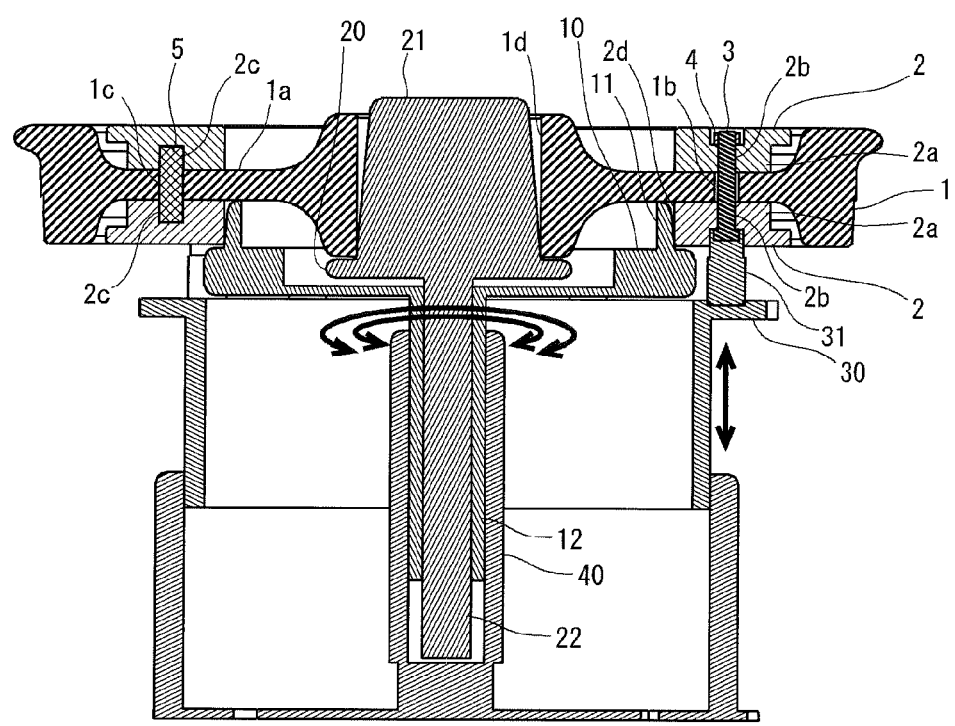
FIG. 2 is a longitudinal sectional view showing a configuration of a device for assembling the wheel with discs according to the present invention.
Figure 3:
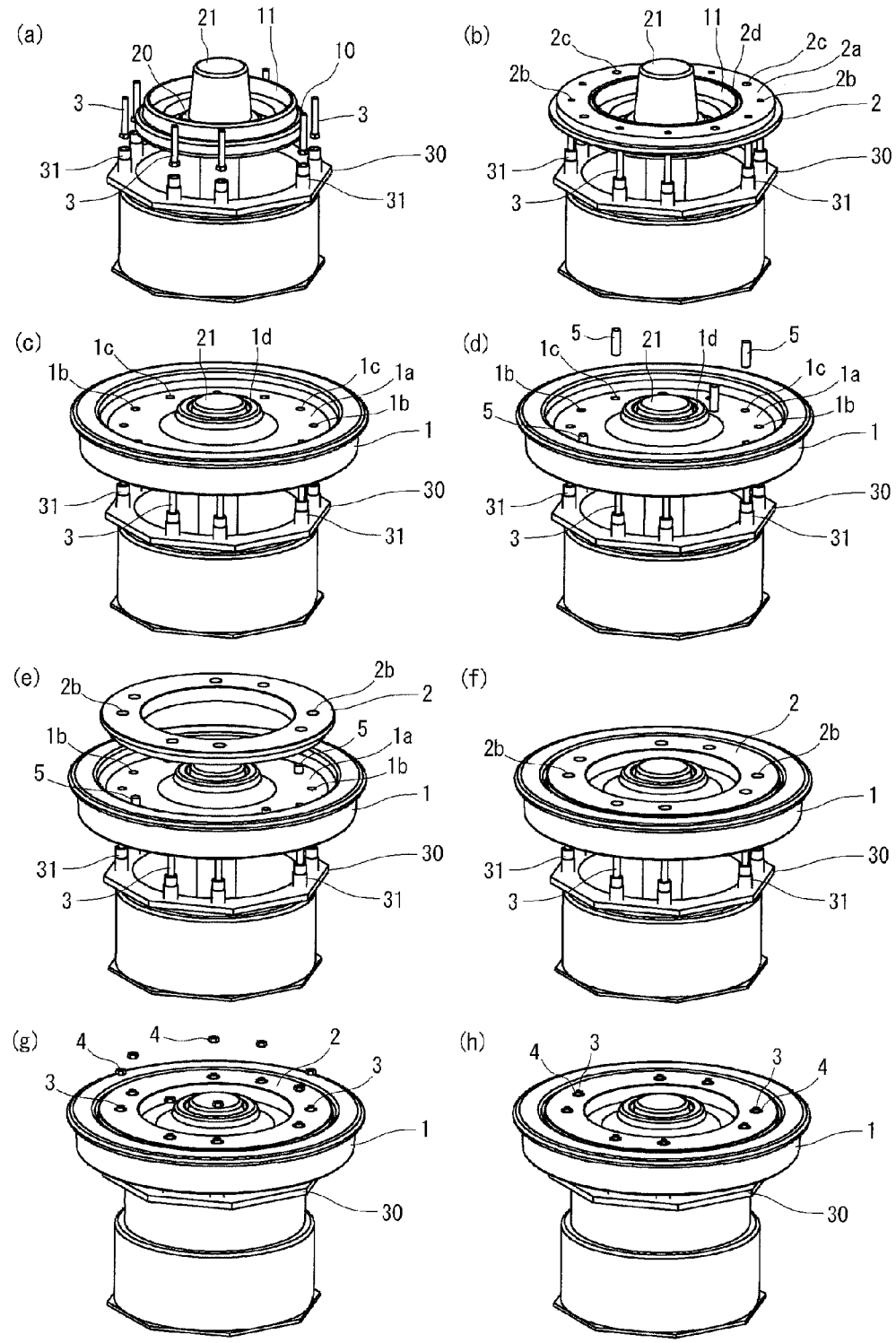
FIG. 3 is a perspective view for describing procedures of assembling the wheel with discs using the assembling device according to the present invention.

FIG. 2 is a longitudinal sectional view showing a configuration of a device for assembling the wheel with discs according to the present invention. FIG. 3 is a perspective view for describing procedures of assembling the wheel with discs using the assembling device according to the present invention. The assembling device according to the present invention is used if the wheel with discs with the center-deviation prevention keys incorporated therein as shown in FIG. 1 is to be assembled, and includes the following constituent elements. That is, as shown in FIGS. 2 and 3, the assembling device according to the present invention includes a disc support 10 that supports the opposite-to-flange disc 2 out of the paired discs 2, a wheel support 20 that supports the wheel 1, and a bolt support 30 that supports the bolts 3.

The disc support 10 is configured to be rotatable about a central axis of the disc support 10 in a vertical direction. For example, as shown in FIG. 2, a tubular shaft 12 protrudes from a lower surface of the disc support 10 along the central axis, and this shaft 12 is fitted into a fixed tubular column 40 via a bearing (not shown).

An annular portion 11 centering about the central axis of the disc support 10 protrudes from an upper surface of the disc support 10. An outer circumferential surface of this annular portion 11 is tapered to reduce a diameter upward, and is formed so that a diameter of a lower end portion of the annular portion 11 is approximately equal to or slightly smaller than a diameter of an internal hole 2*d* of the disc 2.

The opposite-to-flange disc 2 is mounted on the disc support 10 configured as described above in a state in which the surface (frictional surface) thereof is turned downward and in which the internal hole 2*d* is fitted into the annular portion 11. At this time, the centering of the internal hole 2*d* of the opposite-to-flange disc 2 mounted on the disc support 10 is performed after the internal hole 2*d* is fitted into the annular portion 11, so that the opposite-to-flange disc 2 can rotate together with the disc support 10.

The wheel support 20 is provided concentrically with the disc support 10 within the disc support 10. That is, a central axis of the wheel support 20 in the vertical direction matches that of the disc support 10. Furthermore, the wheel support 20 is configured to be rotatable about the central axis. For example, as shown in FIG. 2, a rod-like shaft 22 protrudes from a lower surface of the wheel support 20 along the central axis, and this shaft 22 is fitted into the spindle 12 of the disc support 10 via a bearing (not shown).

A columnar portion 21 centering about the central axis of the wheel support 20 protrudes from an upper surface of the wheel support 20. An outer circumferential surface of this columnar portion 21 is tapered to reduce a diameter upward, and is formed so that a diameter of a lower end portion of the columnar portion 21 is approximately equal to or slightly smaller than a diameter of a hub's bore 1*d* of the wheel 1.

The wheel 1 is mounted on the wheel support 20 configured as described above in a state in which an opposite-to-flange surface thereof is turned downward and in which the hub's bore 1*d* is fitted into the columnar portion 21. At this time, while the wheel 1 mounted on the wheel support 20 is kept in a state of slightly floating from the opposite-to-flange disc 2 mounted on the disc support 10 on this opposite-to-flange disc 2, the centering of the hub's bore 1*d* is performed after the hub's bore 1*d* is fitted into the columnar portion 21, so that the wheel 1 can rotate together with the wheel support 20. Therefore, the opposite-to-flange disc 2 mounted on the disc support 10 and the wheel 1 mounted on the wheel support 20 can individually rotate about the central axis of the wheel 1.

The bolt support 30 is provided concentrically with the disc support 10 and the wheel support 20 outside of the disc support 10. That is, a central axis of the bolt support 30 in the vertical direction matches those of the disc support 10 and the wheel support 20. Furthermore, the bolt support 30 is configured to be movable upward and downward by a drive force of an actuator (not shown).

Moreover, the bolt support 30 includes bolt holding columns 31 for holding the bolts 3 to correspond to positions of the bolt holes 1*b* and 2*b* of the wheel 1 and the respective discs 2. The bolt holding columns 31 hold the bolts 3 with the heads of the bolts 3 inserted into concave portions of upper end surfaces of the bolt holding columns 31, and support the bolts 3 in an upright state.

Using the assembling device as described above, the wheel with discs with the center-deviation prevention keys incorporated therein is assembled through procedures shown below.

(1) As shown in FIG. 3(*a*), the bolt 3 is arranged on each bolt holding column 31 in a state of moving the bolt support 30 downward.

(2) As shown in FIG. 3(*b*), the opposite-to-flange disc 2 out of the paired discs 2 is suspended first by a crane, and mounted on the disc support 10 with the front surface (frictional surface) thereof turned downward. The opposite-to-flange disc 2 is thereby supported with the internal hole 2*d* fitted into the annular portion 11, and made into a state in which the central axis of the opposite-to-flange disc 2 matches that of the disc support 10.

(3) As shown in FIG. 3(*c*), the wheel 1 is suspended by the crane, and mounted on the wheel support 20 with the opposite-to-flange surface thereof turned downward. As a result, the wheel 1 is supported with the hub's bore 1*d* fitted into the columnar portion 21, and made into a state in which the central axis of the wheel 1 matches that of the wheel support 20. Since the wheel 1 and the opposite-to-flange disc 2 are supported by the wheel support 20 and the disc support 10 with the central axes matching each other, respectively, it is thereby possible to individually rotate the wheel 1 and the opposite-to-flange disc 2 about the central axis of the wheel 1.

(4) Next, as shown in FIG. 3(*d*), the wheel 1 is rotated together with the wheel support 20 and the opposite-to-flange disc 2 is rotated together with the disc support 10, whereby the keyholes 1*c* of the wheel 1 are positioned with respect to the key grooves 2*c* of the opposite-to-flange disc 2, and the center-deviation prevention keys 5 are inserted into the keyholes 1*c*. As a result, the center-deviation prevention keys 5 are inserted into the keyholes 1*c* of the wheel 1 with lower end portions thereof engaged with the key grooves 2*c* of the opposite-to-flange disc 2. The center cores of the keyholes 1*c* of the wheel 1 and those of the key grooves 2*c* of the opposite-to-flange disc 2 thereby match those of the center-deviation prevention keys 5. At the same time, the center cores of the bolt holes 1*b* of the wheel 1 match those of the bolt holes 2*b* of the opposite-to-flange disc 2, thus positioning the wheel 1 and the opposite-to-flange disc 2.

In this case, it suffices to confirm whether the keyhole 1*c* is positioned with respect to the key groove 2*c* only in one portion for the following reason. The wheel 1 and the opposite-to-flange disc 2 rotate with the mutual central axes matching each other. Owing to this, as long as the keyhole 1*c* is positioned with respect to the key groove 2*c* only in one portion, the positioning can be simultaneously made in the other portions.

(5) As shown in FIGS. 3(*e*) and 3(*f*), the flange-side disc 2 is suspended by the crane, and moved downward with the front surface (frictional surface) of the flange-side disc 2 turned upward while positioning the key grooves 2*c* thereof with respect to the center-deviation prevention keys 5. As a result, the flange-side disc 2 is made into a state in which the upper end portions of the core-deviation prevention keys 5 are engaged with the key grooves 2*c* of the flange-side disc 2. The center cores of the keyholes 1*c* of the wheel 1 and those of the key grooves 2*c* of the both discs 2 thereby match those of the center-deviation prevention keys 5. At the same time, the center cores of the bolt holes 1*b* of the wheel 1 match those of the bolt holes 2*b* of the both discs 2, thus positioning the wheel 1 and the paired discs 2.

(6) Thereafter, as shown in FIGS. 3(*f*) and 3(*g*), the wheel 1 and the paired discs 2 are integrally rotated together with the wheel support 20 and the disc support 10. The bolt holes 1*b* and 2*b* of the wheel 1 and the respective discs 2 are positioned with respect to the bolts 3, and the bolt support 30 is then moved upward. The bolts 3 are thereby made into a state of being inserted into the bolt holes 1*b* and 2*b* of the wheel 1 and the respective discs 2.

In this case, it suffices to confirm whether the bolt holes 1*b* and 2*b* are positioned with respect to the bolt 3 only in one portion for the following reason. The wheel 1 and the paired discs 2 rotate with the mutual central axes matching one another without center deviation due to the installation of the center-deviation prevention keys 5. Owing to this, as long as the bolt holes 1*b* and 2*b* are positioned with respect to the bolt 3 only in one portion, the positioning can be simultaneously made in the other portions.

(7) As shown in FIGS. 3(*g*) and 3(*h*), the nuts 4 are threaded into the bolts 3, thereby fastening the wheel 1 to the paired discs 2. Furthermore, the bolts 3 and the nuts 4 are additionally threaded with one another at a specified torque and thereby fasten and secure the paired discs 2 to the wheel 1.

In this way, the wheel with discs with the center-deviation prevention keys incorporated therein configured so that the paired discs 2 are arranged to face each other across the web 1*a* of the wheel 1 and the center-deviation prevention keys 5 penetrating this web 1*a*, and that the discs 2 are fastened to the wheel 1 by the bolts 3 is completed.

According to the assembling device of the present invention, the disc support 10 supports the opposite-to-flange disc 2, the wheel support 20 supports the wheel 1, and the wheel support 20 and the disc support 10 are then individually rotated, thereby making it possible to facilitate attaching the center-deviation prevention keys 5. Furthermore, the flange-side disc 2 is mounted on the wheel 1 with the center-deviation prevention keys 5 set as a guide, thereby making the center cores of the bolt holes 1*b* of the wheel 1 match those of the bolt holes 2*b* of the respective discs 2. The wheel 1 and the paired discs 2 are positioned and integrated with one another by the center-deviation prevention keys 5. Owing to this, by integrally rotating the wheel support 20 and the disc support 10, it is possible to facilitate positioning the bolt holes 1*b* and 2*b* of the wheel 1 and the respective discs 2 with respect to the bolts of the bolt support 30. Thereafter, the bolt support 30 is moved upward with respect to the disc support 10 and the wheel support 20, thereby making it possible to facilitate inserting the bolts 3 into the bolt holes 1*b* and 2*b*.

From the foregoing, it is possible for the center cores of the bolt holes 1*b* of the wheel 1 to easily match those of the bolt holes 2*b* of the respective discs 2, and also possible to easily position those bolt holes 1*b* and 2*b* with respect to the bolts 3 of the bolt support 30 with the help of only one person without need to perform these operations carefully. Therefore, it is possible to shorten the assembly work time.

Meanwhile, if the bolt support 30 is moved upward and the discs 2 are fastened to the wheel 1 by the bolts 3 in the assembling device according to the present invention, all the bolts 3 are simultaneously used to fasten the discs 2 in a state in which the heads of the bolts 3 are inserted into and supported by the concave portions of the upper end surfaces of the respective bolt holding columns 31. At this time, if the bolt holding columns 31 are completely fixed to the bolt 3 support 30, then a force of pressing the heads of the bolts generated at the time of fastening the discs 2 by the bolts 3 keeps to be applied to the concave portions of the upper end surfaces of the bolt holding columns 31, and the bolt holding columns 31 often cannot be detached from the opposite-to-flange disc after fastening. To solve this biting problem, it is preferable for the bolt holding columns 31 to have the following structure.

Figure 4:
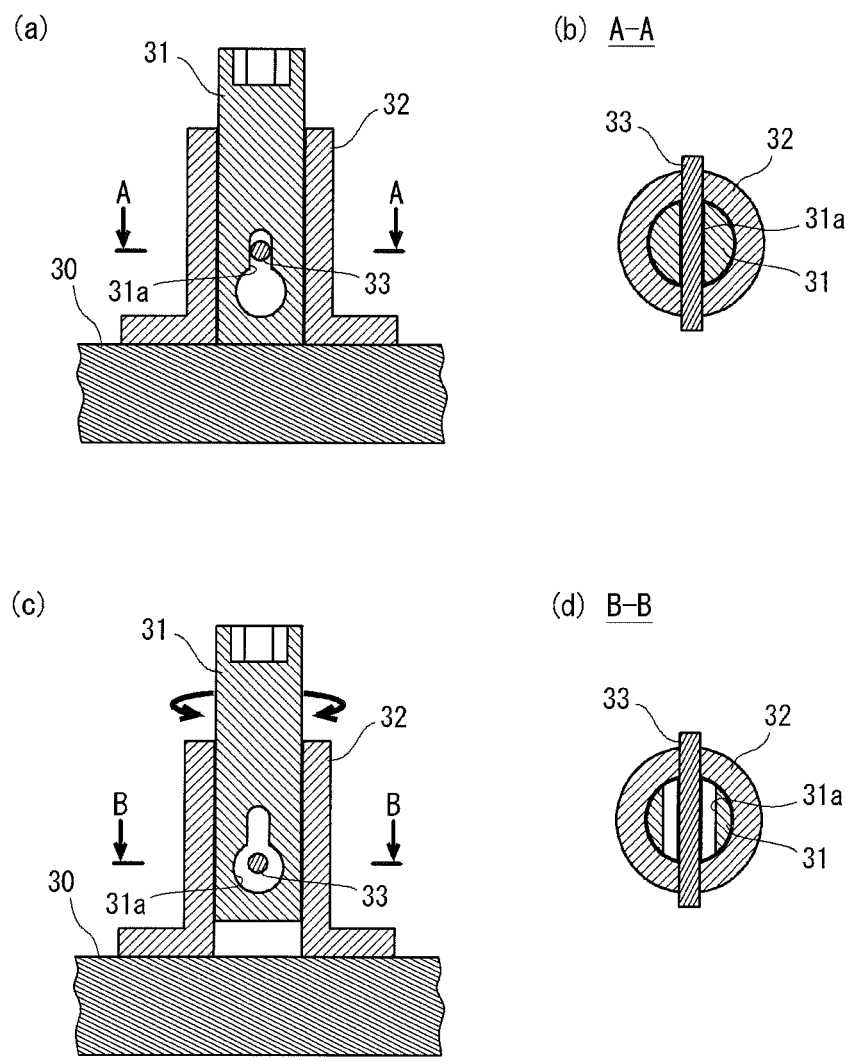
FIG. 4 shows an example of a configuration of a bolt holding column included by a bolt support in the assembling device according to the present invention. In the figure, FIG. 4 (*a*) is a longitudinal sectional view during fastening by bolts, FIG. 4 (*b*) is a cross-sectional view taken along A-A of FIG. 4 (*a*), FIG. 4 (*c*) is a longitudinal sectional view when the bolt support is moved downward after fastening by bolts, and FIG. 4 (*d*) is a cross-sectional view take along B-B of FIG. 4 (*c*)

FIG. 4 shows an example of a configuration of the bolt holding column included by the bolt support in the assembling device according to the present invention. In the figure, FIG. 4 (a) is a longitudinal sectional view during fastening by the bolts, FIG. 4 (b) is a cross-sectional view taken along A-A of FIG. 4(a), FIG. 4 (c) is a longitudinal sectional view when the bolt support is moved downward after fastening by bolts, and FIG. 4(d) is a cross-sectional view take along B-B of FIG. 4(c).

The bolt holding column 31 shown in FIG. 4 is columnar, and fitted into a cylindrical guide portion 32 built upright on an upper surface of the bolt support 30, thereby allowing the bolt holding column 31 to move upward and downward and to rotate along an inner circumferential surface of the cylindrical guide portion 32. Furthermore, an elongate hole 31a in a keyhole shape radially penetrating the bolt holding column 31 is provided in the bolt holding column 31. A pin 33 supported by the cylindrical guide portion 32 penetrates this elongate hole 31a. In this case, the elongate hole 31a is formed so that a width of an upper portion of the elongate hole 31a is approximately equal to or slightly larger than a diameter of the pin 33, and so that a width of a lower portion of the elongate hole 31 is increased.

As shown in FIGS. 4(a) and 4(b), the pin 33 supported by the cylindrical guide portion 32 is located in the upper portion of the elongate hole 31a of the bolt holding column 31 to constrain the rotation of the bolt holding column 31 while the bolt support 30 is moved upward and the discs 2 are fastened by the bolt 3. It is thereby possible to perform the fastening by the bolt 3 without the rotation of the bolt holding column 31.

If the force of pressing the head of the bolt 3 keeps to be applied to the concave portion of the upper end surface of the bolt holding column 31, and the bolt holding column 31 is bitten into the opposite-to-flange disc 2 after the fastening by the bolt 3, the bolt holding column 31 remains to follow the biting and relatively moves upward along the cylindrical guide portion 32 as shown in FIGS. 4(c) and 4(d) when the bolt support 30 is moved downward. As a result, the pin 33 of the cylindrical guide portion 32 moves to the width-increased lower portion of the elongate hole 31a of the bolt holding column 31, thereby releasing the constraint on the rotation of the bolt holding column 31. The bolt holding column 31 is thereby made into a rotatable state within a range of a gap between the pin 33 and the lower portion of the elongate hole 31a. According to the rotation, the biting is eliminated and the bolt holding column 31 detaches from the disc 2. Thereafter, the bolt holding column 31 moves downward along the cylindrical guide portion 32 by its own weight, thus returning to a state shown in FIGS. 4(a) and 4(b).

Therefore, by configuring the bolt holding column 31 to have such a structure, the fastening by the bolts 3 can be performed without causing any problems and the biting problem can be solved.

Moreover, in the assembling device according to the present invention, if the internal holes 2d of the discs 2 to be supported by the disc support 10 are equal in diameter, the centering of the discs 2 can be naturally performed using the annular portion 11 of the same disc support 10. However, if the internal holes 2d of the discs 2 slightly differ in diameter but the same disc support 10 is used, then the disc 2 often rides on the annular portion 11 and the internal hole 2d of the disc 2 cannot be fitted into the annular portion 11 or conversely the internal hole 2d of the disc 2 is loosely fitted into the annular portion 11. This possibly causes a failure in the centering of the internal hole 2d. To address this problem, the disc support 10 is preferably configured to have the following structure.

FIG. 5 shows a modification of a disc support structure provided by the disc support in the assembling device according to the present invention. In the figure, FIG. 5(a) is a plan view, FIG. 5(b) is a cross-sectional view taken along C-C of FIG. 5(a), and FIG. 5 (c) is a view from an arrow D of FIG. 5(a).

The disc support 10 shown in FIG. 5 includes three clutch portions 13 arranged on the same circumference equidistantly and centering about a central axis of the disc support 10 in place of the annular portion 11 shown in FIGS. 2 and 3. Each clutch portion 13 is supported to be radially slidable and movable on the disc support 10 by clutch holding/guiding portions 14 fixed onto the upper surface of the disc support 10, respectively. Furthermore, each clutch portion 13 is urged radially outward of the disc support 10 by a spring 15 provided between the clutch portion 13 and the hook holding/guiding portion 14.

By configuring the disc support 10 to have such a structure, even if the internal holes 2d of the discs slightly differ in diameter, each clutch portion 13 is abutted on the internal hole 2d of any disc 2 and the internal hole 2d can be elastically supported radially outward at a time of mounting the disc 2 on the disc support 10. At this time, the centering of the internal hole 2d of the disc 2 can be performed since outward elastic forces generated by the springs 15 are equally applied to the internal hole 2d of the disc 2 from the respective clutch portions 13. While the number of the clutch portions 13 to be installed is not limited to a specific number, it is possible to realize the function of the clutch portions 13 as long as three or more clutch portions 13 are installed.

Furthermore, the present invention is not limited to the embodiment described above and various changes can be made of the present invention without departure from the gist of the present invention. For example, in the above-described embodiment, the bolt support 30 is configured to move upward and downward relatively to the disc and the wheel support 20. However, as long as the disc and wheel supports 10, 20 and the bolt support 30 are configured to move upward and downward relatively to each other, for example, the disc support 10 and the wheel support 20 can be configured to move upward and downward relatively to the bolt support 30. In short, it suffices to configure the assembling device so that the bolts are inserted altogether into the bolt holes 1b and 2b of the wheel 1 and the paired discs 2 after the wheel 1 and the paired discs 2 are positioned with respect to each other and integrated with each other by the center-deviation prevention keys 5.

Moreover, in the embodiment described above, since the assembling device is designed to deploy the nuts 4 for the fastening on the flange-side disc 2, the opposite-to-flange disc 2 is mounted on the disc support 10. Alternatively if the assembling device is designed to deploy the nuts 4 for the fastening on the opposite-to-flange disc 2, then the arrangement of the wheel 1 and the respective discs 2 is vertically inverted, and the flange-side disc 2 is mounted on the disc support 10.

INDUSTRIAL APPLICABILITY

The assembling device according to the present invention can be effectively used for assembling a railway wheel with brake discs, and particularly useful for assembling a wheel with discs with center-deviation prevention keys incorporated therein that is intended to meet the recent demand of higher speed and lighter weight.

REFERENCE SIGNS LIST 1 railway vehicle
1a web of wheel
1b bolt hole of wheel
1c keyhole of wheel
1d hub's bore of wheel
2 brake disc
2a cooling fin portion of disc
2b bolt hole of disc
2c key groove of disc
2d internal hole of disc
3 bolt
4 nut
5 center-deviation prevention key
10 disc support
11 annular portion
12 shaft
13 clutch portion
14 clutch holding/guiding portion
15 spring
20 wheel support
21 columnar portion
22 shaft
30 bolt support
31 bolt holding column
31a elongate hole
32 cylindrical guide portion
33 pin
40 tubular column

What is claimed is:

1. A device for assembling a railway wheel with brake discs, a pair of brake discs being arranged to face each other across a web of the railway wheel and center-deviation prevention keys penetrating web, the brake discs being fastened to the wheel by bolts, the device comprising:
a disc support supporting an internal hole of one of the brake discs;
a wheel support provided concentrically with the disc support within the disc support, and supporting a hub's bore of the railway wheel on the brake disc supported by the disc support; and
a bolt support provided concentrically with the disc support and the wheel support outside of the disc support, and supporting the bolts to correspond to bolt holes formed in the brake discs and the web of the railway wheel, wherein
the disc support and the wheel support are individually rotatable about a central axis of the railway wheel, and
the disc and wheel supports and the bolt support move up and down relatively to each other.

2. The device for assembling a railway wheel with brake discs according to claim 1, wherein the brake disc supported by the disc support is the brake disc arranged on a side opposite to a flange of the railway wheel.

3. The device for assembling a railway wheel with brake discs according to claim 1, wherein the disc support includes an annular portion into which the internal hole of the brake disc is fitted.

4. The device for assembling a railway wheel with brake discs according to claim 2, wherein the disc support includes an annular portion into which the internal hole of the brake disc is fitted.

5. The device for assembling a railway wheel with brake discs according to claim 1, wherein the disc support includes three or more clutch portions, the clutch portions elastically supporting the internal hole of the brake disc radially outward.

6. The device for assembling a railway wheel with brake discs according to claim 2, wherein the disc support includes three or more clutch portions, the clutch portions elastically supporting the internal hole of the brake disc radially outward.

7. The device for assembling a railway wheel with brake discs according to claim 1, wherein the bolt support includes a bolt holding column, the bolt holding column being columnar and holding a head of the bolt.

8. The device for assembling a railway wheel with brake discs according to claim 2, wherein the bolt support includes a bolt holding column, the bolt holding column being columnar and holding a head of the bolt.

9. The device for assembling a railway wheel with brake discs according to claim 3, wherein the bolt support includes a bolt holding column, the bolt holding column being columnar and holding a head of the bolt.

10. The device for assembling a railway wheel with brake discs according to claim 4, wherein the bolt support includes a bolt holding column, the bolt holding column being columnar and holding a head of the bolt.

11. The device for assembling a railway wheel with brake discs according to claim 5, wherein the bolt support includes a bolt holding column, the bolt holding column being columnar and holding a head of the bolt.

12. The device for assembling a railway wheel with brake discs according to claim 6, wherein the bolt support includes a bolt holding column, the bolt holding column being columnar and holding a head of the bolt.

13. The device for assembling a railway wheel with brake discs according to claim 7, wherein
an elongate hole is provided in the bolt holding column, the elongate hole radially penetrating the bolt holding column, a lower portion of the elongate hole having an increased width, the bolt holding column is fitted into a cylindrical guide portion and allowed to move up and down and to rotate, and a pin supported by the cylindrical guide portion penetrates the elongate hole.

14. The device for assembling a railway wheel with brake discs according to claim 8, wherein
an elongate hole is provided in the bolt holding column, the elongate hole radially penetrating the bolt holding column, a lower portion of the elongate hole having an increased width, the bolt holding column is fitted into a cylindrical guide portion and allowed to move up and down and to rotate, and a pin supported by the cylindrical guide portion penetrates the elongate hole.

15. The device for assembling a railway wheel with brake discs according to claim 9, wherein
an elongate hole is provided in the bolt holding column, the elongate hole radially penetrating the bolt holding column, a lower portion of the elongate hole having an increased width, the bolt holding column is fitted into a cylindrical guide portion and allowed to move up and down and to rotate, and a pin supported by the cylindrical guide portion penetrates the elongate hole.

16. The device for assembling a railway wheel with brake discs according to claim 10, wherein
an elongate hole is provided in the bolt holding column, the elongate hole radially penetrating the bolt holding column, a lower portion of the elongate hole having an increased width, the bolt holding column is fitted into a cylindrical guide portion and allowed to move up and down and to rotate, and a pin supported by the cylindrical guide portion penetrates the elongate hole.

17. The device for assembling a railway wheel with brake discs according to claim 11, wherein
an elongate hole is provided in the bolt holding column, the elongate hole radially penetrating the bolt holding column, a lower portion of the elongate hole having an increased width, the bolt holding column is fitted into a cylindrical guide portion and allowed to move up and down and to rotate, and a pin supported by the cylindrical guide portion penetrates the elongate hole.

18. The device for assembling a railway wheel with brake discs according to claim 12, wherein
an elongate hole is provided in the bolt holding column, the elongate hole radially penetrating the bolt holding column, a lower portion of the elongate hole having an increased width, the bolt holding column is fitted into a cylindrical guide portion and allowed to move up and down and to rotate, and a pin supported by the cylindrical guide portion penetrates the elongate hole.

* * * * *

UNITED STATES PATENT AND TRADEMARK OFFICE
CERTIFICATE OF CORRECTION

PATENT NO. : 9,523,401 B2
APPLICATION NO. : 14/374280
DATED : December 20, 2016
INVENTOR(S) : Iwahashi et al.

It is certified that error appears in the above-identified patent and that said Letters Patent is hereby corrected as shown below:

On the Title Page

Item (87) PCT Pub. Date should read August 1, 2013

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*